UNITED STATES PATENT OFFICE.

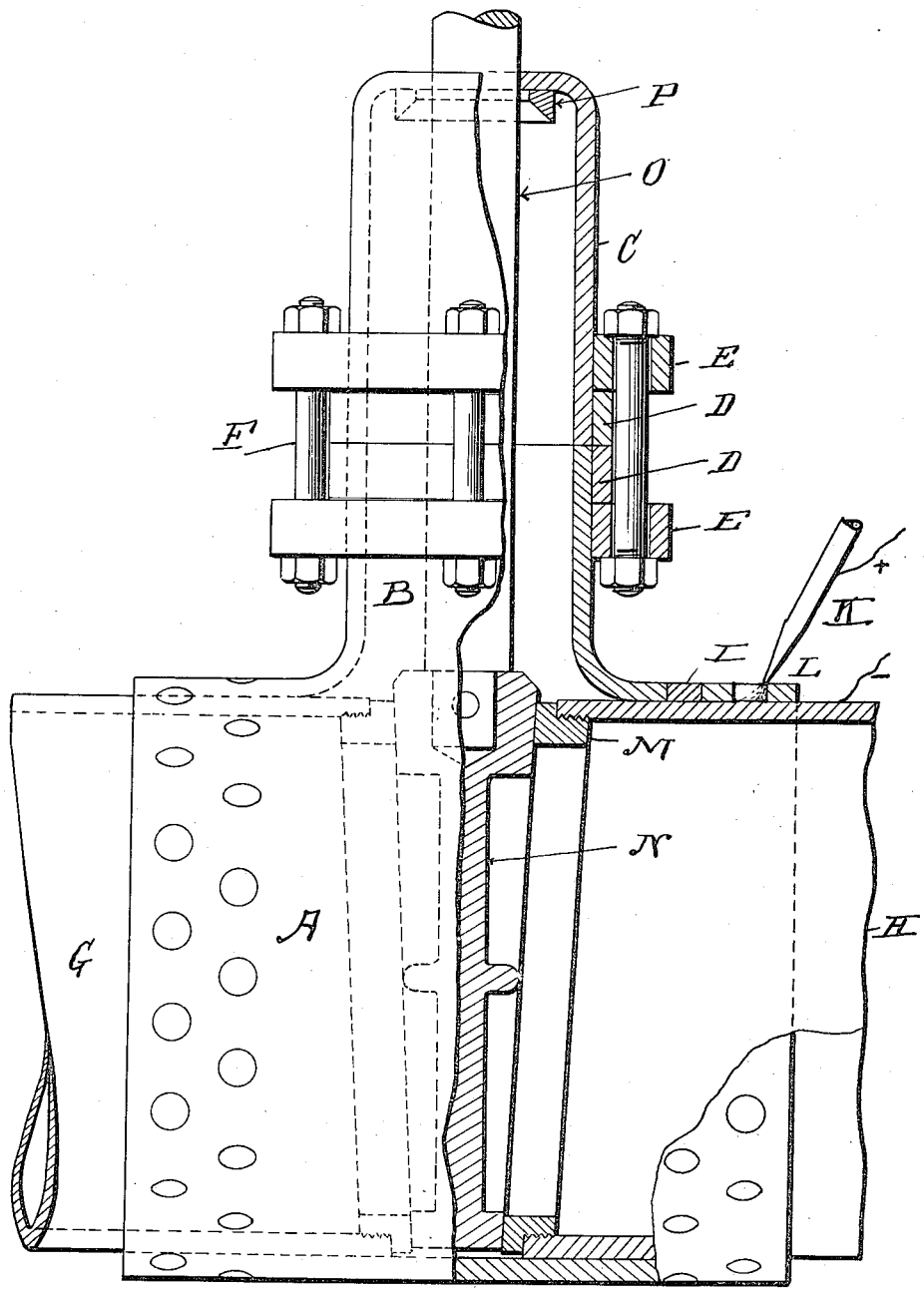

THOMAS E. MURRAY, OF NEW YORK, N. Y.

COUPLING-VALVE.

1,293,874.  Specification of Letters Patent.  Patented Feb. 11, 1919.

Application filed June 15, 1918. Serial No. 240,118.

*To all whom it may concern:*

Be it known that I, THOMAS E. MURRAY, a citizen of the United States, residing at New York, in the county of New York and State of New York, have invented a certain new and useful Improvement in Coupling-Valves, of which the following is a specification.

The invention relates to coupling valves wherein the pipes to be coupled are secured in a tubular valve casing, the valve being disposed in a space between the inner ends of the pipes and seated against them. The valve stem extends through a lateral tubular projection on said casing. The invention consists in the construction, and has for its object to simplify and cheapen the same, as hereinafter more particularly set forth.

The accompanying drawing is a vertical longitudinal section through the valve, casing and connected pipes.

The body of the casing A is tubular and has an integral lateral tubular projection B, registering with which is an inverted cup-shaped cover C. On said cover and projection are reinforcing rings D and flange rings E. Rings E are removably connected by bolts F. Entering the ends of the body of casing A are pipes G, H, having projections I entering openings in the casing body A. To produce the projections I, I prefer to connect each pipe to one terminal of an electric circuit, to the other terminal of which is connected a movable electrode K which I may make of metal and insert it in each of the openings in turn to produce an arc between its end and the portion of the pipe exposed at the opening, so that the metal of said electrode K being deposited in said opening unites with the exposed pipe surface to form the desired projection thereon, as shown at L; or I may make said electrode of carbon and cause the arc to melt the metal of the casing around said opening, the said melted metal then forming the desired projection. This operation is repeated at every opening in the casing wall, and the several projections lock the pipes in the casing. I may also apply the movable electrode K to the joints between each pipe and the ends of the casing, and manually carry said electrode around the joint, thus welding the ends of the casing to said pipes.

The inner ends of the pipes within the casing are cut off at an angle and are internally threaded to receive reinforcing rings, one of which is shown at M. Between said rings there is, therefore, produced a downwardly tapering space or valve seat which receives the correspondingly tapered gate valve N, the stem O of which extends upwardly through the lateral tubular portion B and through the top wall of cover C. Surrounding said stem is a reinforcing ring P, which is welded on the under side of said wall.

The cover, the casing and the valve may each be made in two longitudinally divided parts united at their edges by electric welding.

I claim:

1. A tubular valve casing having an integral lateral tubular projection, pipes entering said tubular casing at opposite ends thereof and secured therein, there being a space between the inner ends of said pipes, a gate valve seated in said space, an inverted cup-shaped cover registering with said tubular projection, reinforcing rings respectively welded to said cover and said projection, flange rings on said cover and said projection receiving said reinforcing rings between them and wider than said reinforcing rings, connecting bolts for said flange rings, and a stem on said valve extending through said cover.

2. A tubular valve casing having an integral lateral tubular projection, pipes entering said tubular casing at opposite ends thereof and secured therein, a gate valve interposed between said pipe ends, an inverted cup-shaped cover registering with said tubular projection, a stem on said valve extending through said cover, and a reinforcing ring surrounding said stem and welded to the under side of the top of said cover.

In testimony whereof I have affixed my signature in presence of two witnesses.

THOMAS E. MURRAY.

Witnesses:
 GERTRUDE T. PORTER,
 MAY T. MCGARRY.